United States Patent
Shepherd et al.

[11] Patent Number: 5,547,585
[45] Date of Patent: Aug. 20, 1996

[54] PROCESS FOR THE REMOVAL OF CONTAMINANTS FROM A FLUID STREAM

[76] Inventors: Samuel L. Shepherd, 5211 Mulberry Grove, Kingwood, Tex. 77345; Anthony M. Wachinski, 3 Biscay Ct., The Woodlands, Tex. 77381

[21] Appl. No.: 218,661

[22] Filed: Mar. 28, 1994

[51] Int. Cl.$^6$ ................................. B01D 15/04
[52] U.S. Cl. ................. 210/673; 95/136; 95/137; 210/679; 423/244.02; 423/539; 423/563
[58] Field of Search .................. 210/670, 673, 210/679, 695; 95/135, 136, 137; 423/244.02, 539, 563

[56] References Cited

U.S. PATENT DOCUMENTS

| | | | |
|---|---|---|---|
| 3,560,378 | 2/1971 | Weiss et al. | 210/695 |
| 3,607,740 | 9/1971 | Akeroyd | 210/679 |
| 3,977,984 | 8/1976 | Roberts | 210/679 |
| 4,314,905 | 2/1982 | Etzel et al. | 210/679 |
| 5,021,163 | 6/1991 | Anderson et al. | 210/679 |

*Primary Examiner*—Ivars Cintins
*Attorney, Agent, or Firm*—Harrison & Egbert

[57] ABSTRACT

A method for reducing contaminant concentrations in a fluid stream including the steps of forming a metal-complexed material having a surface suitable for exchange with the contaminant, contacting the fluid stream with the metal-complexed material, immobilizing at least a portion of the contaminant on the surface of the metal-complexed material, and regenerating the metal-complexed material so as to remove the contaminant from the surface of the metal-complexed material. The metal-complexed material is formed by the encapsulating of a core of ferromagnetic material with an ion exchange material. The metal-complexed material is magnetically affixed to a metallic mesh retaining surface.

3 Claims, 1 Drawing Sheet

U.S. Patent        Aug. 20, 1996        5,547,585
FIG. 1
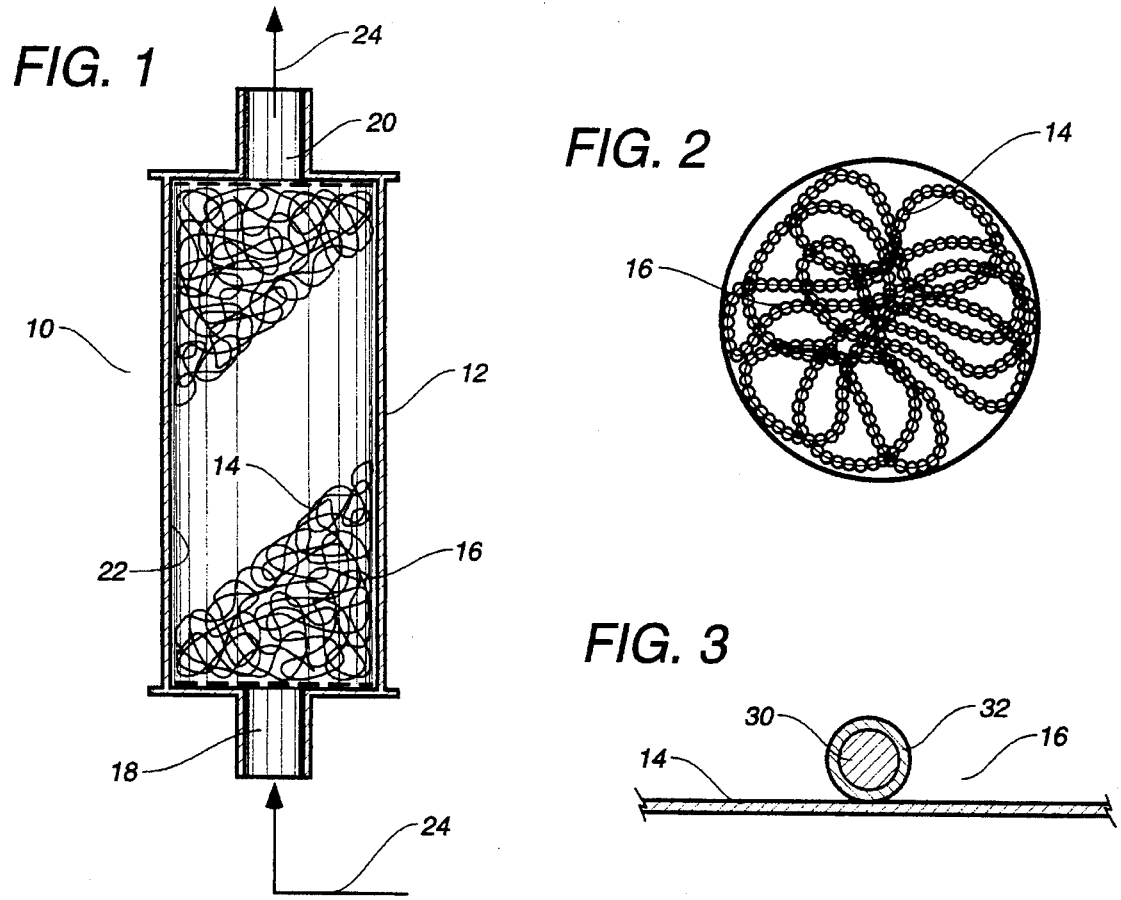
FIG. 2
FIG. 3
FIG. 4
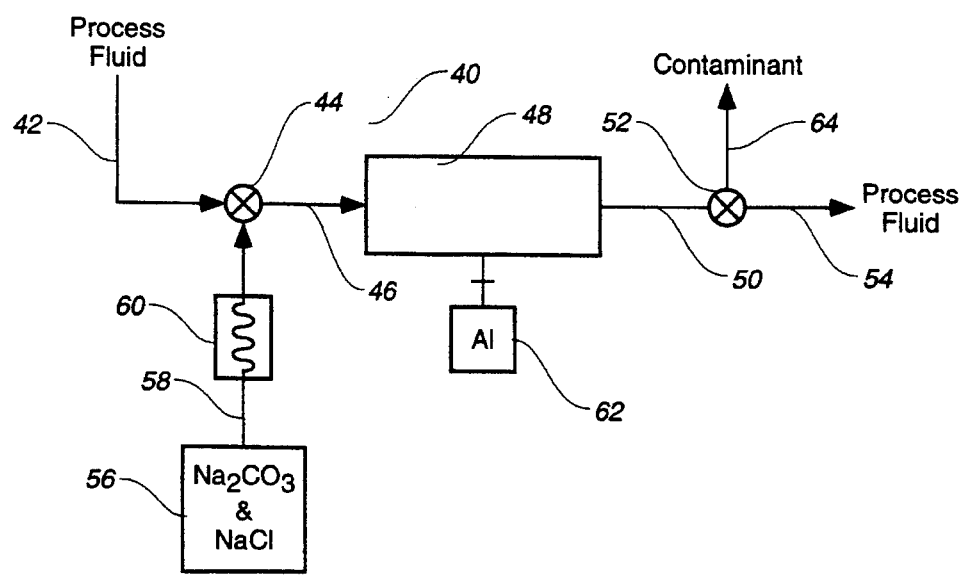

PROCESS FOR THE REMOVAL OF CONTAMINANTS FROM A FLUID STREAM

TECHNICAL FIELD

The present invention relates to apparatus and methods for the removal of contaminants from fluid streams. More particularly, the present invention relates to the removal of contaminants in fluids by contacting the fluids with an immobilized metal-complexed material. Additionally, the present invention relates to methods for the regeneration of metal-complexed materials following contaminant removal.

BACKGROUND ART

Part of the present invention, the most economical approach for the removal of sulphur from fluid streams is through the use of amine addition. There are also a number of ways of removing hydrogen sulfide from hydrocarbon streams. The three most common methods employed include: (1) iron sponge processes; (2) hot potassium carbonates; and (3) amine addition. The iron sponge process requires low gas and hydrogen sulfide flowrates. It has a relatively low initial cost and also has high efficiency for gas streams with low hydrogen sulfide content. The hot potassium carbonate process can handle high gas rates and high hydrogen sulfide levels of 5% to 50%. The hot potassium carbonate process reduces hydrogen sulfide levels to less than 0.1%. The process is very stable and does not require extensive heat exchange equipment. The amine addition process utilizes monoethanolamine (MEA) and/or diethanolamine (DEA). The amine addition process can handle high gas rates and low to intermediate hydrogen sulfide levels (1% to 5%). The amine addition process can reduce hydrogen sulfide to less than 1 grain per 100 cubic feet. The iron sponge process is used primarily for natural gas desulfurization while the carbonate and amine processes are used in refinery processes.

Of these three processes, the amine addition process is the most popular since refinery waste gases generally have high hydrogen sulfide concentrations and a greater removal efficiency is obtained. Both DEA and MEA are used, with DEA being preferred since MEA is degraded by carbonyl sulfide and carbon disulfide in the gas streams.

Amine solutions will absorb both hydrogen sulfide and carbon dioxide according to the following reactions:

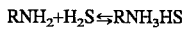

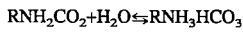

The absorption of hydrogen sulfide occurs at 100° F. or below. The desorption of the sulfide from the amine happens at 240° F. The amine desulfurization process involves contacting the sour gas stream with a cool amine solution to absorb the hydrogen sulfide and then regenerating the amine and stripping the hydrogen sulfide from the amine solution by heating. The hydrogen sulfide, removed from the gas stream, is either burned and converted to sulfur dioxide, converted to elemental sulfur using the Claus process, or the amine-sulfur salt is collected as marine bunker fuel and burned at sea.

Another process was developed by one of the inventors to the present application for the removal of sulfur from fluids or the sulfur from silver ore. This invention, described in U.S. patent application Ser. No. 08/151,911, filed on Nov. 15, 1993, and entitled "Composition and Process for the Removal of Sulfur from Silver" comprises a composition that includes a mixture of generally 33 weight percent sodium carbonate, 66 weight percent sodium chloride, and 0.02 weight percent of cayenne pepper in an aqueous solution. The aqueous solution includes two to six ounces of the mixture per gallon of water. The mixture can further include a non-oxidized aluminum material.

Another process, developed by Etzel and Shay, teaches a water purification process related specifically to reducing selenium and arsenic concentrations in contaminated water or wastewater streams. Iron loaded cation exchange resins, when contacted with contaminated water or wastewater streams, are effective for forming immobilized complexes with selenite and arsenate contaminants. The iron loaded resins can be easily regenerated by sequential treatment with acid and a solution of a soluble iron salt. In this process, selenium is primarily in the form of selenite. This process contacts the contaminated water or wastewater stream with a cation exchange resin, preferably a strong acid cation exchange resin. The selenite anions react with the resin complexed iron cations to form iron selenite complexes immobilized on the resin surface. To optimize the removal of selenium as selenite, the process includes the step of treating the contaminated water or wastewater stream to convert essentially all of the non-selenite selenium contaminants to selenite before contacting the water or wastewater stream with the iron (II)-complexed cation exchange resin. When a selenite-contaminated water or wastewater stream is passed through a bad of an iron (II)-complexed strong acid cation exchange resin, iron-selenite forms as an immobilized ionic complex on the surface of the cation exchange resin resulting in a treated water or wastewater stream having a reduced selenium concentration. The iron complexed cation exchange resin is readily regenerated for re-use by contacting it with an acid (to release the iron selenite complex and form the acid state of the resin) and thereafter with a solution of a water soluble iron salt.

Another prior process has employed fine mesh magnetized ion exchange resins for water softening (exchanging calcium and magnesium ions for sodium ions). This process, developed by Etzel and Wachinski, one of the present co-inventors, uses less than 20 micron diameter fine mesh magnetized ion exchange particles in a columnar operation. The particles are formed by encapsulating a core of magnetic material in an ion exchange resin. The particles are magnetized and disposed in a column where they attach to magnetic mesh retention means, such as stainless steel wool. The design of the column permits use of the fine mesh ion exchange particles and their properties of rapid exchange rates and efficient utilization of resin capacity, while avoiding the prior problems of plugging, fouling, and excessive pressure drop.

Various U.S. patents have issued in the past concerning processes for the removal of contaminants from a fluid stream. U.S. Pat. No. 2,798,580, issued to Voigtman, discloses a coated felted or bat-type fibrous material such as cellulosics, glass, or asbestos with various ion exchange resins to increase their exchange capacity. Others have encapsulated magnetic particles in ion exchange resins. Examples of this are Weiss et al., U.S. Pat. No. 3,560,378, Turbeville, U.S. Pat. No. 3,657,119, and Weiss et al., U.S. Pat. No. 3,890,224. Weiss at al. '378 recognized the problems that fine ion exchange resins exhibited such as excessive pressure drop, quick fouling, and loss through entrainment. The solution in this patent was to use the encapsulated resins in an agitated mixer system during liquid treatment and then to magnetically coalesce the resin particles after treatment. The Weiss patent did not purport to solve the problems associated with fine mesh resins when used in a fixed-bed process. They did compare the reaction kinetics of gamma iron oxide particles encapsulated with trimethylol phenol N,N his (3-amino propylmethylamine) having a particle size range of 250–500 microns with a standard size 350–1200 micron resin in fixed bed operation and found them to be substantially the same.

Svyadoshich et al. in "Wastewater Purification Using Superparamagnetic Dispersed Ion Exchanger In Constant Magnetic Field", 10 *Soviet Inventions Illustrated* 2, Nov. of 1976, taught a column surrounded by an electromagnetic coil which produces a magnetic field of 350 Oersted and a super-paramagnetic cation exchange resin 40–60 microns in diameter to obtain ion exchange rates eight times faster than conventional size resins.

In the field of water purification, attempts have been made to use high-gradient magnetic fields to separate and extract weakly paramagnetic submicron particles from fluid streams. DeLatour and Kolm, "High-Gradient Magnetic Separation: A Water Treatment Alternative", in the *Journal of American Water Works Association* of Jun. 1976 discloses a number of suggestions for separation, including possible use of a matrix of stainless steel wool in a column under the influence of a magnetic field to capture and hold magnetic particles from a fluid stream.

Until the invention by Wachinski and Etzel, none of the above-mentioned prior art disclosures satisfactorily solved the problems associated with fine mesh resins in fixed-bed columnar operation. Wachinski and Etzel's process increased the efficiency of the ion exchange processes in fixed-bed columnar operation while avoiding the problems associated with fine mesh ion exchange resins when used in such columns. The Wachinski and Etzel's process was specific for the use of fine mesh resin as a traditional ion exchanger to reduce the concentration of calcium and magnesium ions. This process had no application to processes involved in the reduction of contaminants in all fluid streams (compressible and non-compressible) utilizing immobilized metal complexes.

It is an object of the present invention to provide an apparatus and method for the effective removal of contaminants from a fluid stream.

It is another object of the present invention to provide an apparatus and method that allows for the regeneration of the contaminant-removing materials.

It is a further object of the present invention to provide a method and apparatus that is cost effective, efficient, and effective.

These and other objects and advantages of the present invention will become apparent from a reading of the attached specification and appended claims.

SUMMARY OF THE INVENTION

The present invention is a method for reducing contaminant concentrations in a fluid stream that comprises the steps of: (1) forming a metal-complexed material having a surface suitable for exchange with the contaminant; (2) contacting the fluid stream with the metal-complexed material; (3) immobilizing at least a portion of the contaminant on the surface of the metal-complexed material; and (4) regenerating the metal-complexed material so as to remove the contaminant from the surface of the metal-complexed material. In the method of the present invention, the step of forming a metal-complexed material includes the step of encapsulating a core of ferromagnetic material with an ion exchange material. The ion exchange material contains a metal, such as silver or copper. The metal-complexed material is magnetically affixed to a retaining surface. This retaining surface is a metallic mesh material. The metal-complexed material has particles which have a size of less than 20 microns.

In the method of the present invention, the step of regenerating comprises the steps of: (1) mixing sodium bicarbonate with sodium chloride in an aqueous solution; (2) interacting the aqueous solution with the immobilized contaminant on the metal-complexed material; and (3) contacting the metal-complexed material with aluminum or hydrogen during the step of interacting. The aqueous solution can be heated prior to the step of interacting. The aqueous solution is heated to a temperature of not less than 180° F. Cayenne pepper can be added to the mixture of sodium carbonate and sodium chloride. In this step of regenerating, the step of mixing includes the step of combining four parts by weight of sodium bicarbonate with two parts by weight of sodium chloride, and adding the combined sodium bicarbonate and sodium chloride in an amount of two to six ounces per gallon of water.

BRIEF DESCRIPTION OF THE DRAWINGS

FIG. 1 is a cross-sectional view of the apparatus of the present invention.

FIG. 2 is a magnified view of the metal-complexed material affixed to the metallic mesh.

FIG. 3 is a magnified cross-sectional view of the single particle of the metal-complexed material.

FIG. 4 is a block diagram showing the process of the present invention.

DETAILED DESCRIPTION OF THE INVENTION

Referring to FIG. 1, there is shown at 10 the apparatus in accordance with the present invention for the reduction of the concentration of contaminants in fluids. The apparatus 10 includes a chamber 12 and a metallic mesh material 14 disposed within an interior of the chamber. As will be described hereinafter, a plurality of particles 16 are magnetically affixed to the mesh material 14.

As can be seen, the chamber 12 is in the form of a column having an inlet 18 and an outlet 20. The inlet 18 and an outlet 20 communicate with the interior 22 of the chamber 12. The inlet 18 serves for the purpose of passing a fluid stream 24 into the interior 22 of the chamber 12. Similarly, the outlet 20 allows for the passage of the fluid stream 24, following the reaction with the metal-complexed material, to pass from the interior 22 of chamber 12. The inlet 18 can also serve to allow for the introduction of a regenerating solution into the interior 22 of chamber 12. Similarly, the outlet 20 can also be used for either the introduction of the regenerating solution or for the passage of the reacted regenerating solution and the contaminants from the chamber 12.

As can be seen in FIG. 1, the metallic mesh material 14 extends along at least a portion of the length of the column 12. The exact amount of metallic mesh material 14 required to be installed within the interior 22 of the chamber 12 will depend upon the contaminant content of the fluid stream 24 and will also depend upon the number of particles that the mesh 14 must support. Specifically, the mesh material 14 is a steel wool mesh material.

FIG. 2 is a more detailed view of the relationship of the strands of the mesh material 14 and the particles 16. The particles 16 extend along the surfaces of the strands 14. Each of the particles 16 is magnetically affixed to the surface of the strand 14. The magnetic attraction between the particles 16 and the strand 14 should be sufficient so as to withstand the flow forces which are imparted upon the particles 16 by the flow stream 24. In general, the use of spherical particles 16, affixed to the strand 14, dramatically increases the surface area which is available for reaction with the incoming fluid flow 24. Each of the particles 16 has a size of less than twenty microns.

In FIG. 3, there is shown an isolated view of a single particle 16 as magnetically attached to a surface of the strand 14. It can be seen that the particle 16 includes a core 30 of a ferromagnetic material. The core 30 is encapsulated with an ion exchange resin 32. As used in the present invention, the particle 16 can be a commercially available ion exchange resin or it can be a fine mesh ion exchange resin formed by encapsulating the core 30 of magnetic material in the ion exchange resin 32. The ion exchange resin 32 creates an exchange phenomenon with the contaminant found in the fluid stream 24.

The term "ion exchange" describes a myriad of terms, i.e., ion exchange process, the ion exchange phenomenon, or the unit operation of ion exchange. It is also referred to as an adsorption process and as a sorption process. This ion exchange process occurs daily in soils, humus, cellulose, wool, proteins, carbon, aluminum oxide, lignin and living cells. Technically speaking, ion exchange describes a physical-chemical process in which ions that are held by electrostatic forces to charged functional groups on the surface of a solid are exchanged for ions of similar charge in the solution in which the solid is immersed. During the process, electronegativity is maintained when the ions in the solution phase are sorbed by the ion exchange solid 32. The exchanger solid releases replacement ions back into solution. Certain ions in the solution are preferentially sorbed by the ion exchanger solid 32. Because this exchange of ions occurs at the surface of the solid and because the exchanging ions undergo a phase change from solution onto a surface and from a surface into the solution, ion exchange is typically referred to as a sorption process. The present invention, however, is not limited to sorption or adsorption or ion exchange type processes. As an example, fluoride in water can be reduced in concentration by contacting the fluoride with a strong acid cation exchanger resin with its exchange sites saturated with aluminum or with a chelating resin with its exchange sites saturated with aluminum or with a fine mesh magnetic resin with its sites saturated with aluminum. The fluoride anions react with the resin complexed aluminum to form aluminum fluoride complexes on the resin surface. As another example, in the present invention, hydrogen sulfide or sulfur dioxide can be reduced from air or water streams by contacting the contaminated gas or water stream with a cation exchange resin, preferably a strong acid cation exchange resin loaded, i.e., the exchange sites saturated with silver. The hydrogen sulfide or sulfur dioxide has a high affinity for the silver (the mechanism of silver tarnishing) and is reduced in the stream. In this invention, if the same principle of a loaded ion exchange resin is carried further and the fine mesh magnetic resin is loaded with silver, a short contact time adsorber is created for the economical removal of hydrogen sulfide or sulfur dioxide. This same principle can be used to remove hydrogen sulfide or sulfur dioxide from water and wastewater streams. Other metals, in addition to silver may be used in the process. The present invention should not be limited to the use of silver as the exchange material 32. Within the scope of the present invention, if the contaminant must be removed in a reduced state, then the reduction can occur upstream of the process.

FIG. 4 shows the process 40 of the present invention. In the process 40 of the present invention, the processed fluid 42 passes through a valve 44, through a conduit 46, and into the chamber 48. The chamber will have a configuration similar to the chamber 12 illustrated in the apparatus 10 of FIG. 1. Chamber 48 will include the mesh material 14 and the particles 16 arranged in a proper manner so as to react with the processed fluid 42 passing through the chamber 48. The passing of the fluid 42 through the chamber 48 will cause the fluid stream to come into contact with the metal-complexed material on the interior of chamber 48. As described previously, at least a portion of the contaminant within the processed fluid 42 is immobilized on the surface of the metal-complexed material. As an example, if the fluid stream 42 is sulfur dioxide, and the ion exchange resin 32 is copper or silver, then the resin 32 will immobilize the sulfur from the fluid stream on the surface of the particle 16. After this reaction has occurred, the fluid stream 42 will pass outwardly of chamber 48 through conduit 50, through valve 52 and to the outlet 54. This process will continue for a length of time until the resin 32 is saturated to such an extent that it will no longer receive the sulfur portion of the fluid stream 42.

An important aspect of the present invention is the regeneration of the metal-complexed resin 32 for producing a concentrated contaminant stream. The metal-complexed immobilizing resin is prepared by treating the acid form of the resin with a metal salt depending upon the targeted ion. As an example, and as an important embodiment of the present invention, when the metal-complexed immobilized solid is used to remove hydrogen sulfide or sulfur dioxide from a gas stream, then a solution of sodium bicarbonate and sodium chloride can be used to regenerate the metal-complexed material for the purpose of removing the contaminant from the surface of the metal-complexed material.

As can be seen in FIG. 4, the conduit 46 leading as an inlet to the chamber 48 is connected by valve 44 to a source 56 of an aqueous solution of sodium chloride and sodium bicarbonate. Initially, the sodium carbonate is mixed with the sodium chloride in an aqueous solution. Specifically, four parts by weight of sodium bicarbonate are combined with for parts by weight of sodium chloride. The combined sodium carbonate and sodium chloride are added in an amount of two to six ounces per gallon of water as part of the aqueous solution in the source 56. The aqueous solution from the source 56 is passed through line 58 through a heat exchanger 60. Heat exchanger 60 will heat the aqueous solution to a temperature of not less than 180° F. This heated aqueous solution is then passed through valve 44, through conduit 46, and into the chamber 48. The flow of the processed fluid 42 is stopped when it is necessary to regenerate the metal-complexed material within the chamber 48. The aqueous solution of sodium chloride and sodium bicarbonate is interacted with the immobilized contaminant on the metal-complexed material within the chamber 48. Additionally, and simultaneously, the metal-complexed material is contacted with aluminum 62 during the step of interacting. In a simple approach to the present invention, a portion of the mesh material 14 on the interior of the chamber 48 can be contacted to the aluminum 62 such that the electrolytic reaction can properly occur between the particles 16 and the aqueous solution in the chamber 48.

The aqueous solution of sodium chloride and sodium bicarbonate found in the source 56 was developed after a great deal of experimentation. Initially, the solution of the present invention was discovered during cooking activities when food was being prepared in an aluminum pan. Initially, a mixture of baking soda (sodium bicarbonate) and salt (sodium chloride) was mixed with heated water in an aluminum pan. After the mixture was prepared, cayenne pepper was added to the mixture. A tarnished silver spoon was then introduced into the aqueous solution of the sodium bicarbonate, the sodium chloride, and the cayenne pepper. It was found that the tarnish on the silver spoon instantaneously disappeared when the spoon was contacted to a surface of the aluminum pan. The tarnish was not removed when the tarnished silver spoon was not in electrical contact with the aluminum. As a result of this cooking activity, an effective solution for the removal of sulfur from silver was discovered. Initially, it was discovered that the most essential component to the sulfur-removing solution was the sodium bicarbonate. The sodium chloride was added so as to facilitate the electrolytic action between the aluminum and the metal-complexed resin. After experimentation, it was found that the combination of the sodium bicarbonate and sodium chloride would remove sulfur almost instantaneously at a temperature of 180° F.

When cayenne pepper was added to the mixture, the same reaction took place, but at a temperature of slightly less than 180° F.

During experimentation with the sulfur-removing composition, it was found that the aqueous solution at 70° F. would take approximately four days to remove the sulfur. At 130° F., the sulfur would be removed in approximately four minutes. However, the removal of the sulfur occurred almost instantaneously at temperatures of 180° F. or greater.

The contact of the metallic mesh material 14 with the aluminum 62 or hydrogen gas establishes the necessary electrolytic action so as to facilitate the reaction in which the sulfur is almost instantaneously removed from the mesh 14. As a result of this process, the sulfur is reacted so as to be removed from the silver (or copper) on the particles 16. The sulfur will be maintained, in solution, in the form of either sulfuric acid ($H_2SO_4$), hydrogen sulfide ($H_2S$), or aluminum sulfide (AlS). As such, the byproduct from the removal of sulfur from the fluid stream 42 is a sellable byproduct.

After this reaction has occurred, the reacted solution, including the sulfur, is passed from the chamber through conduit 50, through valve 52 and through outlet 64. After this process has been completed, then the metal-complexed material has been properly regenerated for acting on the process stream 42.

The foregoing disclosure and description of the invention is illustrative and explanatory thereof. Various changes in the details of the illustrated apparatus, or in the steps of the described method, may be made within the scope of the appended claims without departing from the true spirit of the invention. The present invention should only be limited by the following claims and their legal equivalents.

We claim:

1. A method for reducing contaminant concentrations in a fluid stream comprising the steps of:

forming a metal-complexed material having a surface suitable for exchange with the contaminant by encapsulating a core of ferromagnetic material with an ion exchange material wherein the metal complexed material is magnetically affixed to a metallic mesh retaining surface, which metal-complexed material has particles which have a size of less than 20 microns, said ion exchange material containing a metal selected from the group consisting of: silver and copper;

contacting the fluid stream with the metal-complexed material;

immobilizing at least a portion of the contaminant on the surface of the metal-complexed material; and regenerating the metal-complexed material so as to remove the contaminant from the surface of the metal-complexed material, said step of regenerating comprising the steps of:

mixing four parts by weight of sodium bicarbonate with two parts by weight sodium chloride in an agueous solution, the combined sodium bicarbonate and sodium chloride being in an amount of two to six ounces per gallon of water;

interacting said agueous solution with the immobilized contaminant on the metal-complexed material, said agueous solution having a temperature of not less than 180° F.; and contacting the metal-complexed material with aluminum or hydrogen during the step of interacting.

2. The method of claim 1, said step of mixing further comprising the step of:

adding cayenne pepper to the mixture of sodium bicarbonate and sodium chloride.

3. A method of treating a sulfur-containing fluid comprising the steps of:

conveying the fluid to a chamber, said chamber containing particles having a core of magnetic material encapsulated in an ion exchange mesh material, said ion exchange resin having a component selected from the group consisting of: silver and copper;

contacting the fluid with said particles in said chamber for a time sufficient to effect a physical chemical reaction between the fluid and said ion exchange resin;

passing the fluid from the chamber after the physical chemical reaction;

introducing a regenerating solution into said chamber, said regenerating solution being an aqueous solution of four parts by weight of sodium bicarbonate with two parts by weight of sodium chloride, the combined sodium bicarbonate and sodium chloride being in an amount of two to six ounces per gallon of water;

reacting the regenerating solution with said particles so as to remove a contaminant material from a surface of said particles, said regenerating solution having a temperature of not less than 180° F.;

contacting the mesh material with an aluminum material or hydrogen during said step of reacting; and removing the reacted regenerating solution and the contaminant material from said chamber.

* * * * *